3,585,190
DIETHYLAMINOETHYLATED CELLULOSE-ACID
ANHYDRIDE REACTION PRODUCTS
Donald M. Soignet, Metairie, and Ruth R. Benerito and
Mary W. Pilkington, New Orleans, La., assignors to
the United States of America as represented by the
Secretary of Agriculture
No Drawing. Filed Oct. 31, 1968, Ser. No. 772,427
Int. Cl. C08b 3/12, 3/20, 3/22
U.S. Cl. 260—226                    3 Claims

ABSTRACT OF THE DISCLOSURE

The tertiary amine groups of diethylaminoethyl cotton act as an internal catalyst for the reaction of cellulose hydroxyls with anhydrides to form esters. The cellulose esters are stable to mild acid steeping and unstable under mild basic conditions. Anhydrides containing halogen atoms yield products with increased resistance to rot.

A non-exclusive, irrevocable, royalty-free license in the invention herein described, throughout the world for all purposes of the United States Government, with the power to grant sublicenses for such purposes, is hereby granted to the Government of the United States of America.

This invention relates to the modification of diethylaminoethyl cotton cellulose by acid anhydrides. The built-in amine groups of diethylaminoethylated cotton function as catalyst for the reaction. Specifically, this invention relates to the formation of cellulose esters of diethylaminoethyl, which esters possesses rot resistant properties, by a process of reacting the cellulose hydroxyls, under the specific catalytic effect of the tertiary amine groups of the diethylaminoethylated cotton with the organic acid anhydride, 1,4,5,6,7,7 - hexachlorobicyclo-[2.2.1]-5-heptene-2,3-dicarboxylic acid anhydride and tetrabromophthalic anhydride.

The main object of this invention is to provide a process for esterifying diethylaminoethyl cellulosic materials. A further object is to utilize the built-in amine groups of diethylaminoethylated cottons as the catalyst for the esterifying process. Another object is to impart rot resistance to diethylaminoethyl cellulose materials by forming the cellulose esters thereof with halogenated acid anhydrides.

The esters of this invention are stable to acid and neutral hydrolysis but are susceptible to basic hydrolysis. Anhydrides containing a variety of groups or atoms other than halogen atoms can be introduced into aminized cellulose by this method. Extreme reaction conditions characteristic of conventional esterifications are not necessary to produce esters by the process of this invention. Cross-linking of the cellulose can be achieved by employing active dibasic acid anhydrides.

The various anhydrides investigated were hexanoic, glutaric, maleic, pyrotartaric, citraconic, tetraiodophthalic, 7-oxabicyclo - [2.2.1]hept - 5 - ene - 2,3-dicarboxylic, 4-methyl - 4 - cyclohexene-1,2-dicarboxylic, maleo-pimaric acid, 5-norbornene-2,3-dicarboxylic acid, tetrabromo phthalic, 1,4,5,6,7,7-hexachlorobicyclo-[2.2.1]-5-heptene-2,3 - dicarboxylic, and [2.2.1]-5-heptene-2,3-dicarboxylic acid anhydride.

EXAMPLE 1

Diethylaminoethylated cotton of 1.00% nitrogen and untreated cotton were placed in a 20% by weight solution of 1,4,5,6,,7,7 - hexachlorobicyclo - [2.2.1]-5-heptene-2,3-dicarboxylic (chlorendic) anhydride in acetone for 24 hours at room temperature. After washing in acetone, then methanol and finally water, the esterified diethylaminoethylated cotton contained 3.30% chlorine and the esterified control cotton 0.34% chlorine. Rot resistance of the two is set forth in the table below. The esterified diethylaminoethylated cotton retained 100% of its breaking strength after soil burial for 33 days in an activated bed whereas the esterified control cotton was destroyed completely after only 13 days.

TABLE I

| Treated sample | Cl, percent | Breaking strength (lb.)—Burial for— | | | |
|---|---|---|---|---|---|
| | | 0 days | 13 days | 35 days | 94 days |
| Diethylaminoethyl | 3.30 | 43 | 39 | 43 | 18 |
| Untreated | 0.34 | 52 | 0 | 0 | 0 |

EXAMPLE 2

Diethylaminoethylated cotton of 1.00% nitrogen and an unmodified control cotton were treated as in Example 1 with a 20% by weight solution of 3,4,5,6 tetrabromo-1,2 phthalic anhydride in dimethyl formamide. Solvent exchange to water was performed by washing first in DMF, then methanol, and finally in water. The esterified diethylaminoethylated cotton contained 2.43% bromine and the esterified control cotton only about 0.20%. The rot resistance imparted is demonstrated by the table below.

TABLE II

| Treated sample | Br, percent | Breaking strength (lb.)—Burial for— | | | |
|---|---|---|---|---|---|
| | | 0 days | 13 days | 35 days | 94 days |
| Diethylaminoethyl | 2.43 | 43 | 38 | 37 | 12 |
| Untreated | 0.20 | 51 | 0 | 0 | 0 |

EXAMPLE 3

Diethylaminoethylated cotton of 0.80% nitrogen was treated at room temperature in a 20% solution of the following anhydrides in acetone for 24 hours.

TABLE III

| Anhydrides | | Add-on, wt., percent | Wrinkle recovery (W+F)° | | IR absorption [1] (microns) | |
|---|---|---|---|---|---|---|
| Name | Formula | | Wet | Cond. | Ester | COO- |
| Hexanoic | [(CH$_3$(CH$_2$)$_4$]$_2$ A[2] | 2.0 | 187 | 198 | 5.75(M) | 6.35(M) |
| Glutaric | CH$_2$(CH$_2$)$_2$A | 12.8 | 243 | 146 | | |
| Maleic | (CH)$_2$A | 8.4 | 233 | 169 | 5.80(M) | 6.30(S) |
| Pyrotartaric | CH$_3$CH(CH$_2$)A | 5.3 | 186 | 202 | 5.76(S) | 6.32(S) |
| Citraconic | (CH-C)(CH)A | 4.0 | 147 | 230 | 5.76(Sh) | 6.50(S) |
| Tetraiodophthalic [3] | | 3.5 | 205 | 197 | 5.77(S) | 6.27(S) |
| 7-oxabicyclo[2.2.1]hept-5-ene-2,3-dicarboxylic.[3] | | 3.8 | 166 | 209 | 5.77(S) | 6.27(S) |
| 4-methyl-4-cyclohexene-1,2-dicarboxylic. | | 5.3 | 182 | 233 | 5.77(M) | 6.33(M) |
| Maleo-pimaric acid | | 1.6 | 182 | 228 | 5.76(Sh) | 6.33(B) |
| 5-norbornene-2,3-dicarboxylic | | 4.5 | 168 | 202 | 5.77(M) | 6.31(M) |
| DEAE control | | | 168 | 225 | | |

[1] (S) strong; (M) medium; (B) broad; (Sh) shoulder.
[2] A represents an anhydride group.
[3] Reacted at room temperature in a 20% solution of the anhydride in dimethylformamide.

We claim:
1. A process for esterifying fibrous diethylaminoethyl cotton cellulose with an organic acid anhydride which process consists in its entirety of reacting fibrous diethylaminoethyl cotton cellulose, at room temperature and for a time interval of at least 24 hours, with an excess of the organic acid anhydride to produce the fibrous ester.

2. The process for esterifying fibrous diethylaminoethyl cotton cellulose with 1,4,5,6,7,7 - hexachlorobicyclo-[2.2.1]-5-heptene-2,3-dicarboxylic anhydride, which process comprises reacting, at room temperature and for a time interval of at least 24 hours, fibrous diethylaminoethyl cotton cellulose with an acetone solution containing an excess of 1,4,5,6,7,7-hexachloro-bicyclo-[2.2.1]-5-heptene-2,3-dicarboxylic anhydride and freeing the resulting fibrous cellulosic reaction product from unreacted anhydride reagent by washing serially with acetone, methanol, and water.

3. The process for esterifying fibrous diethylaminoethyl cotton cellulose with 3,4,5,6 tetrabromo-1,2-phthalic anhydride, which process comprises reacting, at room temperature and for a time interval of at least 24 hours, fibrous diethylaminoethyl cotton cellulose with a solution of dimethylformamide containing an excess of 3,4,5,6 tetrabromo-1,2-phthalic anhydride and freeing the resulting fibrous cellulosic reaction product from unreacted anhydride reagent by washing serially with dimethylformamide, methanol, and water.

References Cited
UNITED STATES PATENTS

| | | | |
|---|---|---|---|
| 2,825,623 | 3/1958 | Stephens et al. | 260—232 |
| 2,852,508 | 9/1958 | Hiatt et al. | 260—226 |
| 2,856,399 | 10/1958 | Mench et al. | 260—224 |
| 3,051,698 | 8/1962 | Elizer et al. | 260—224 |
| 3,359,258 | 12/1967 | Toms | 260—232 |

DONALD E. CZAJA, Primary Examiner

R. W. GRIFFIN, Assistant Examiner

U.S. Cl. X.R.

8—129; 260—232